United States Patent [19]
Alex et al.

[11] Patent Number: 6,138,628
[45] Date of Patent: Oct. 31, 2000

[54] CAMSHAFT CONTROLLER, IN PARTICULAR FOR USE IN AN INDUCTION MANIFOLD SYSTEM FOR A MULTI-CYLINDER INTERNAL COMBUSTION ENGINE

[75] Inventors: Matthias Alex, Heilbronn; Volker Ernst, Sachsenheim; Michael Geiger, Freiberg; Arthur Klotz, Remseck; Juergen Kosicki, Erligheim; Klaus Rentschler, Gaufelden, all of Germany

[73] Assignee: Filterwerk Mann & Hummel GmbH, Ludwigsburg, Germany

[21] Appl. No.: 09/381,581

[22] PCT Filed: Feb. 26, 1998

[86] PCT No.: PCT/EP98/01090

§ 371 Date: Dec. 3, 1999

§ 102(e) Date: Dec. 3, 1999

[87] PCT Pub. No.: WO98/42966

PCT Pub. Date: Oct. 1, 1998

[51] Int. Cl.[7] ............. F01L 7/00; F02M 35/10
[52] U.S. Cl. ............. 123/190.1; 123/184.55; 123/190.17
[58] Field of Search ............. 123/184.53, 184.55, 123/80 R, 190.1, 190.17

[56] References Cited

U.S. PATENT DOCUMENTS

| | | | |
|---|---|---|---|
| 4,019,487 | 4/1977 | Guenther | 123/190.17 |
| 4,932,369 | 6/1990 | Parr | 123/184.42 |
| 5,048,469 | 9/1991 | Spray | 123/184.42 |
| 5,438,964 | 8/1995 | Breidenbach | 123/184.55 |
| 5,526,780 | 6/1996 | Wallis | 123/190.6 |
| 5,829,403 | 11/1998 | Suzuki et al. | 123/184.55 |
| 5,870,988 | 2/1999 | Fujimori et al. | 123/184.55 |
| 5,901,677 | 5/1999 | Ohrnberger et al. | 123/184.31 |
| 5,979,389 | 11/1999 | Espe et al. | 123/184.55 |

*Primary Examiner*—Tony M. Argenbright
*Assistant Examiner*—Hai Huynh
*Attorney, Agent, or Firm*—Evenson, McKeown, Edwards & Lenahan, P.L.L.C.

[57] ABSTRACT

A camshaft controller (10), in particular for use in an induction manifold system for a multi-cylinder internal combustion engine, including an induction distributor (11) with individual induction pipes (16 to 19) which are disposed adjacent one another and terminate in a flange. The camshaft controller (10) is disposed in a longitudinal bore in the individual induction pipes (16 to 19) and serves to open and close the induction pipes. Associated with each individual induction pipe is a sealing element (43 to 50) which is secured to the camshaft controller (10).

8 Claims, 4 Drawing Sheets

CAMSHAFT CONTROLLER, IN PARTICULAR FOR USE IN AN INDUCTION MANIFOLD SYSTEM FOR A MULTI-CYLINDER INTERNAL COMBUSTION ENGINE

BACKGROUND OF THE INVENTION

The invention relates to a camshaft controller, especially for use in an induction manifold system for a multicylinder internal combustion engine.

A camshaft controller of this kind is disclosed, for example, in U.S. Pat. No. 4,932,369. It is disposed in an air induction system, an induction manifold being provided from which individual intake tubes arranged side by side lead to a flange. This air induction system is fastened by this flange to the cylinder head of a multicylinder internal combustion engine. The individual intake tubes are intersected by a longitudinal bore. In this longitudinal bore a camshaft controller is provided, which is configured such that the length of the air intake tube is varied by turning it.

Furthermore, an induction tube apparatus for a multicylinder internal combustion engine is disclosed in DE-OS 4344504. It too has a camshaft controller which is disposed in a longitudinal bore, and the camshaft controller can be used to connect or disconnect additional ducts.

If the induction system consists of plastic, it is necessary to equalize manufacturing tolerances by appropriate elements, such as an impressed metal sleeve. Manufacture thus becomes very expensive. Moreover there is the problem that any recycling of the plastic component and the incorporated metal sleeve is impossible or possible only after a corresponding complicated disassembly.

SUMMARY OF THE INVENTION

It is the object of the invention to avoid the described disadvantages and to provide a camshaft controller which is well sealed and in which tolerances are effectively compensated.

This object is achieved by the invention as described and claimed hereinafter.

The substantial advantage of the invention is that the camshaft controller has sealing elements associated with the individual intake tubes, the sealing elements having a negligible effect on the torque required for driving the camshaft controller.

In an especially advantageous embodiment of the invention, the sealing element is made up of two sealing bars which are parallel to one another and are joined at their ends by radially elastic ring elements. Thus a sealed window is formed, which due to the elasticity of the ring elements is in resilient contact between the camshaft controller and the inner wall of the longitudinal bore and thus reliably seals each individual passage and each flow cross section of the individual intake tubes. The sealing element can be disposed at the entrance or exit opening of the induction tube. It is useful to provide it where it produces the best effect.

An advantageous embodiment of the invention furthermore consists in fixing the ring elements in grooves in the camshaft controller. The ring elements in that case are snapped like a clamp over the camshaft controller and seal the latter in the manner of a piston ring.

An additional embodiment of the camshaft controller provides for forming the latter of individual segments. In that case the segments are joined together such that, on the one hand, a great torsional stiffness is achieved, but on the other hand a certain radial mobility remains in order to compensate tolerances.

It is furthermore advantageous to provide at least one end of the camshaft controller with a bearing, the bearing bush being fastened in a socket of the induction system with a resilient element interposed. The interposition of the resilient element damps vibrations and also results in compensation of tolerances.

The rotation of the camshaft controller is advantageously effected by an actuator. This can be an electric motor, a vacuum box or any desired hydraulically or mechanically driven element. The adjusting motion is advantageously transferred by a radially movable claw clutch.

In addition, a clutching or connection between the actuator and the camshaft controller can be performed by a pin and bushing, the latter being connected together with the interposition of a damping element, such as an O-ring for example. The use of the camshaft controller is possible wherever a duct or a chamber must be switched open and closed. For example, its application to an adaptive bypass resonator is conceivable.

The application of sealing elements to the camshaft controller enables the longitudinal bore to have a conical shape. By means of this conical configuration, it becomes simpler to remove the air induction system from its mold.

These and additional features of preferred embodiments of the invention will be found not only in the claims but also in the description and the drawings, and the individual features can be realized each by itself or together in the form of subcombinations in the embodiment of the invention and in other fields, and can constitute advantageous as well as independently patentable embodiments, for which protection is hereby claimed.

BRIEF DESCRIPTION OF THE DRAWINGS

The invention will be explained hereinafter with reference to working embodiments.

DETAILED DESCRIPTION OF PREFERRED EMBODIMENTS

Figure 1:
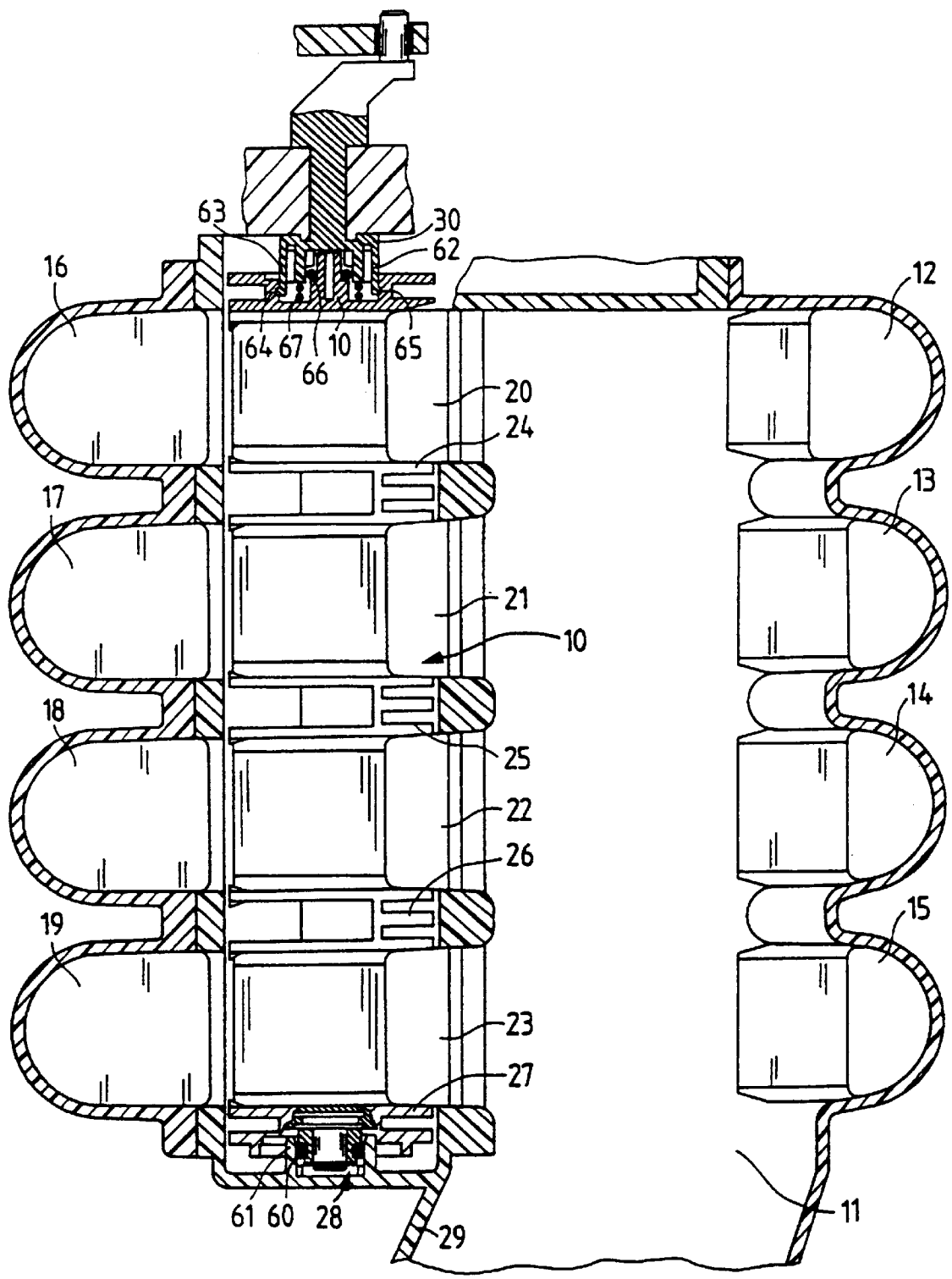
FIG. 1 shows a longitudinal section of a camshaft controller in an induction manifold system.

A plan view according to FIG. 1, with a camshaft controller in an induction manifold system, shows an air intake manifold 11 for a four-cylinder internal combustion engine. From the air intake manifold 11, individual induction tubes 12, 13, 14, 15, extend to a connecting flange, not shown here. A camshaft controller 10 opens or closes so-called power ducts. These can comprise shorter individual induction tubes 16, 17, 18, 19, which likewise open through the connecting flange. The camshaft controller 10 has openings 20, 21, 22, 23. Between these are supporting rods 24, 25, 26, 27. The camshaft controller is mounted through a bearing 28 and a resilient element in the intake manifold housing 29. At the opposite end the camshaft controller has a lever arm 30 by which an actuator, not shown here, can rotate it to several positions.

The slide bearing 28 is mounted resiliently through an O-ring 66 in a recess 61 of the air intake manifold 11. In this way length tolerances can be compensated. Also, the resilient mounting provides for the damping of vibrations. The lever arm 30 is equipped with sections 62, 63. These extend into grooves 64, 65, and thus form a claw clutch. In addition a resilient coupling is provided through an O-ring 66 between the lever arm 30 and the camshaft controller 10. A spring 67 provides for compensation of tolerances in length.

Figure 2:
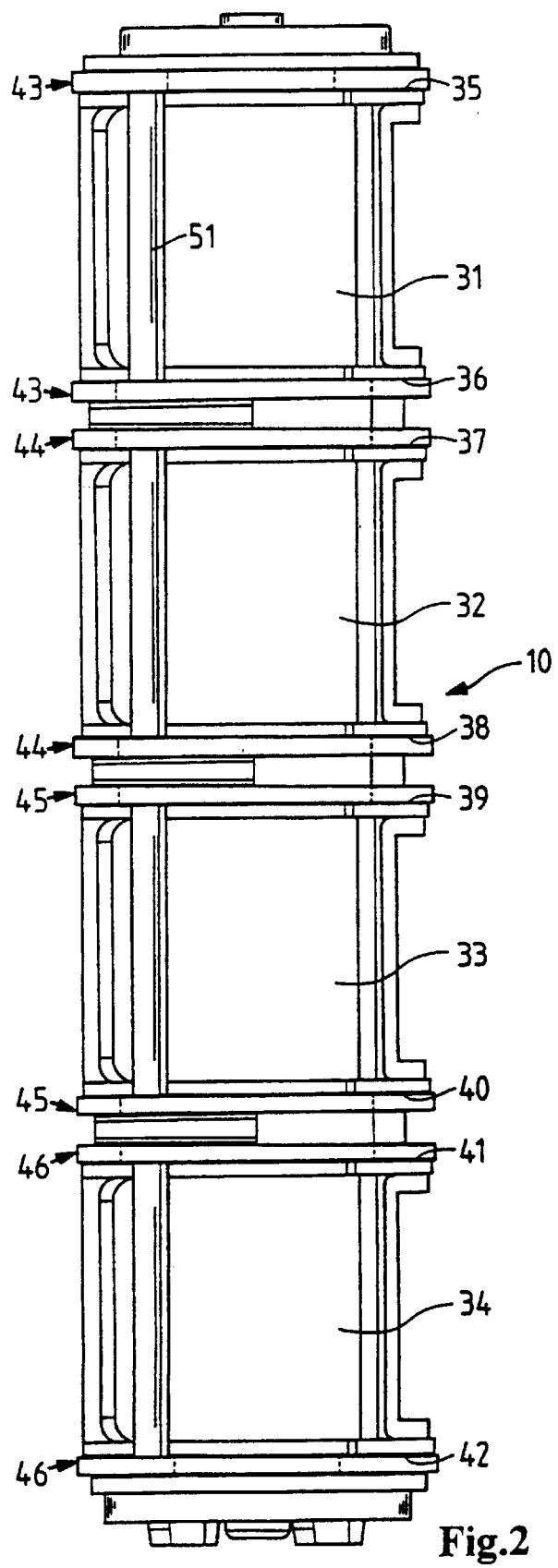
FIG. 2 shows a detail view of the camshaft controller.

In FIG. 2 a camshaft controller 10 is shown in a detail view. This camshaft controller has openings 31, 32, 33, 34, for the passage of the intake air. Grooves 35 to 42 are provided laterally at the openings. A sealing element in the form of a sealing cage 43–46 is inserted into each of these grooves.

Figure 3:
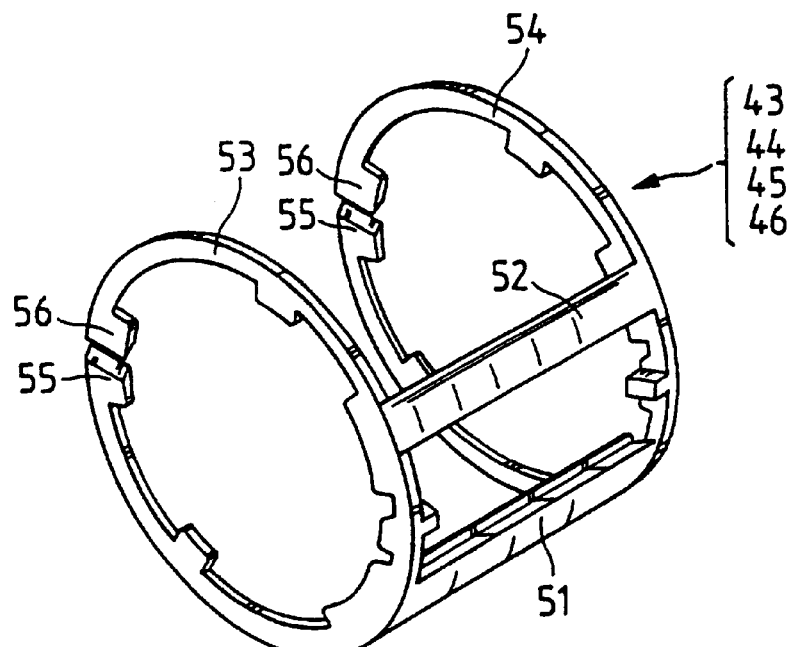
FIG. 3 shows a perspective view of a sealing cage.

FIG. 3 shows a perspective view of a sealing cage. This is comprised of two sealing bars 51, 52. These may extend parallel and are connected at each of their ends with a respective ring 53, 54.

Figure 4:
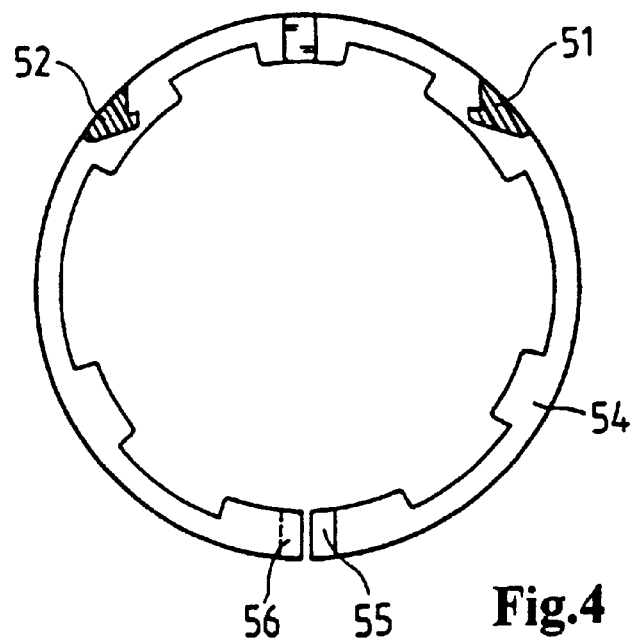
FIG. 4 shows a sectional view of the sealing cage.

In the detailed illustration of FIG. 4, it can be seen that each of the sealing bars 51, 52, has a projection formed thereon. These projections are designed so that the sealing cage will enter and engage into undercuts of the camshaft controller and at the same time provide a sealing function. The ring 54 is open opposite the area where the sealing bars 51, 52, are fastened, and thus it can straddle the stepping cylinder and enter into the corresponding grooves. In the installed state, the end portions 55, 56, of the ring 54 overlap each other by means of an inclined face formed on each of them, and thus form a closed sealing ring in the manner of a piston ring.

Figure 6:
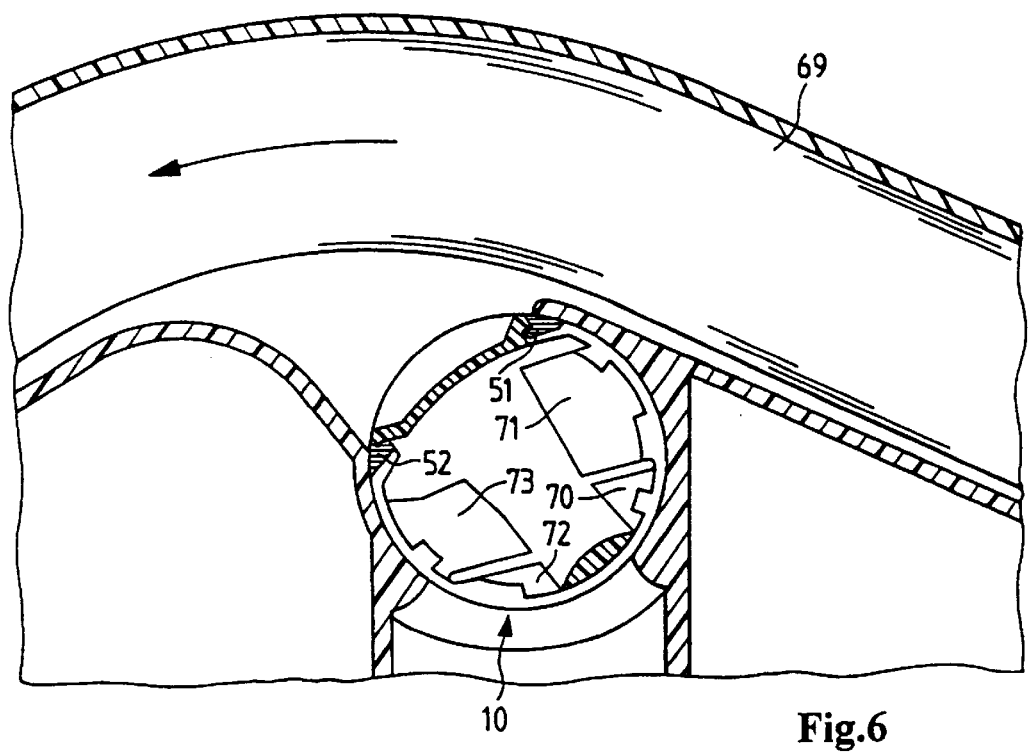
FIG. 6 shows a detail of an induction manifold system with a rotary valve in the open position.

FIG. 6 shows the camshaft controller 10 in the closed position in an individual induction tube 12 of an air intake manifold 11. In the upstream area, the sealing cage 43 seals off the entrance opening by means of the two sealing bars 51, 52. Also, the ring 53 provides for lateral sealing and thus simultaneously prevents any cross flow in the longitudinal bore. To open the individual induction tube 12, the camshaft controller 10 is rotated approximately 90°. On account of the spring-like properties of the rings of the sealing cage, it is assured that in every position of the camshaft controller the rings as well as the two sealing bars will be in contact with the wall of the longitudinal bore and thereby assure the sealing action.

Figure 5:
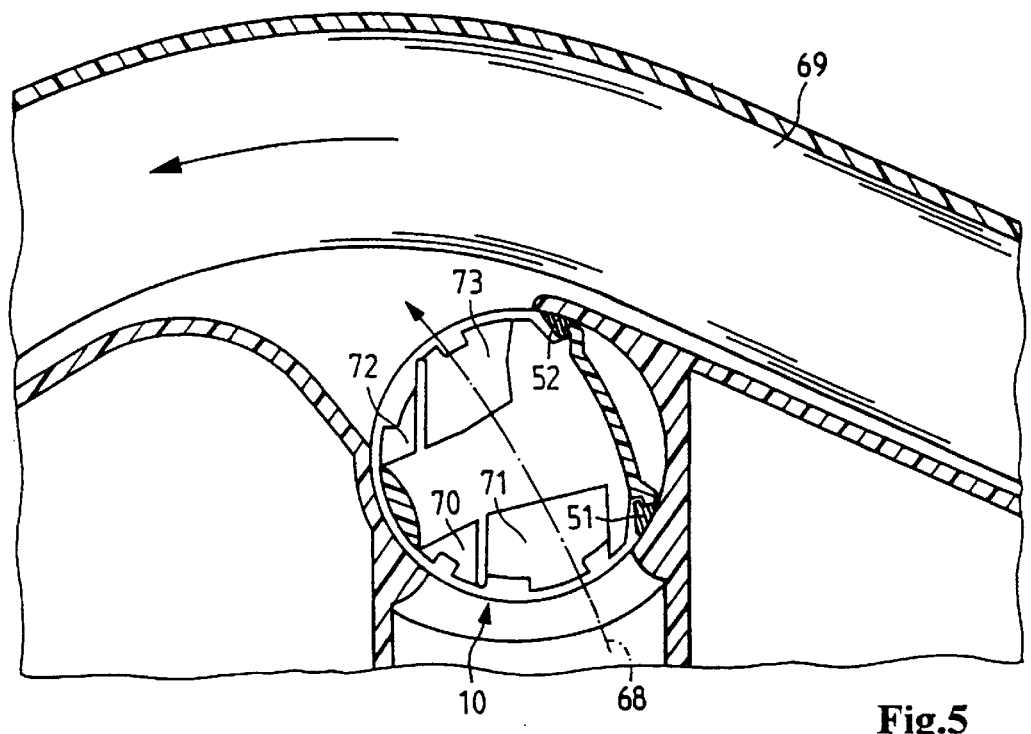
FIG. 5 shows a detail of an induction manifold system with a rotary valve in the closed position.

FIG. 5 shows the variant of an air induction system with a rotary valve in the open position, i.e., in this case inducted air can additionally flow according to the arrow 68 into the main air induction duct 69. The rotary valve or camshaft controller 10 is provided with transverse openings 70, 71, 72, 73. These establish a connection between the individual air intake ducts in the open position, and thus improve the delivery of air to the individual cylinders of the internal combustion engine.

What is claimed is:

1. A camshaft controller arrangement for an air induction system for a multi-cylinder internal combustion engine comprising an air intake manifold and individual air intake tubes arranged side by side and terminating in a flange, wherein said camshaft controller arrangement is disposed in a longitudinal bore in the individual air intake tubes for closing and opening inlet or outlet openings of the individual air intake tubes, said camshaft controller arrangement having a controller element and a sealing element disposed thereon and associated with each individual air intake tube, said sealing element comprising at least two parallel sealing bars which are connected at their ends by radially resilient ring elements, said sealing bars being resiliently in contact with said longitudinal bore in which the controller element is disposed, at the inlet or outlet opening of each individual air intake tube, and said sealing bars having projections for engaging said controller element.

2. A camshaft controller arrangement according to claim 1, wherein said resilient ring elements are fixed in grooves in the camshaft controller.

3. A camshaft controller arrangement according to claim 1, wherein said controller is comprised of individual segments which are coupled to one another in a torsionally rigid and radially movable manner.

4. A camshaft controller arrangement according to claim 1, wherein at least one end of said camshaft controller element is journaled in a bearing bush secured in a recess in the air induction system by a resilient element interposed between said bearing bush and said recess.

5. A camshaft controller arrangement according to claim 1, further comprising an actuator for turning the camshaft controller and a claw clutch for connecting the actuator to the camshaft controller element so that movement of the actuator is transmitted to the camshaft controller element.

6. A camshaft controller arrangement according to claim 1, wherein a pivot bearing is provided, which has a resilient element between the pivot and the bush.

7. A camshaft controller arrangement according to claim 1, wherein said resilient element is an O-ring.

8. A camshaft controller arrangement according to claim 1, wherein said controller is provided with transverse openings which form cross connections between the individual intake tubes when the individual intake tubes are open.

* * * * *